Feb. 11, 1930.　　　　J. H. ASHBAUGH　　　　1,746,756
REGULATOR SYSTEM
Filed Dec. 9, 1927
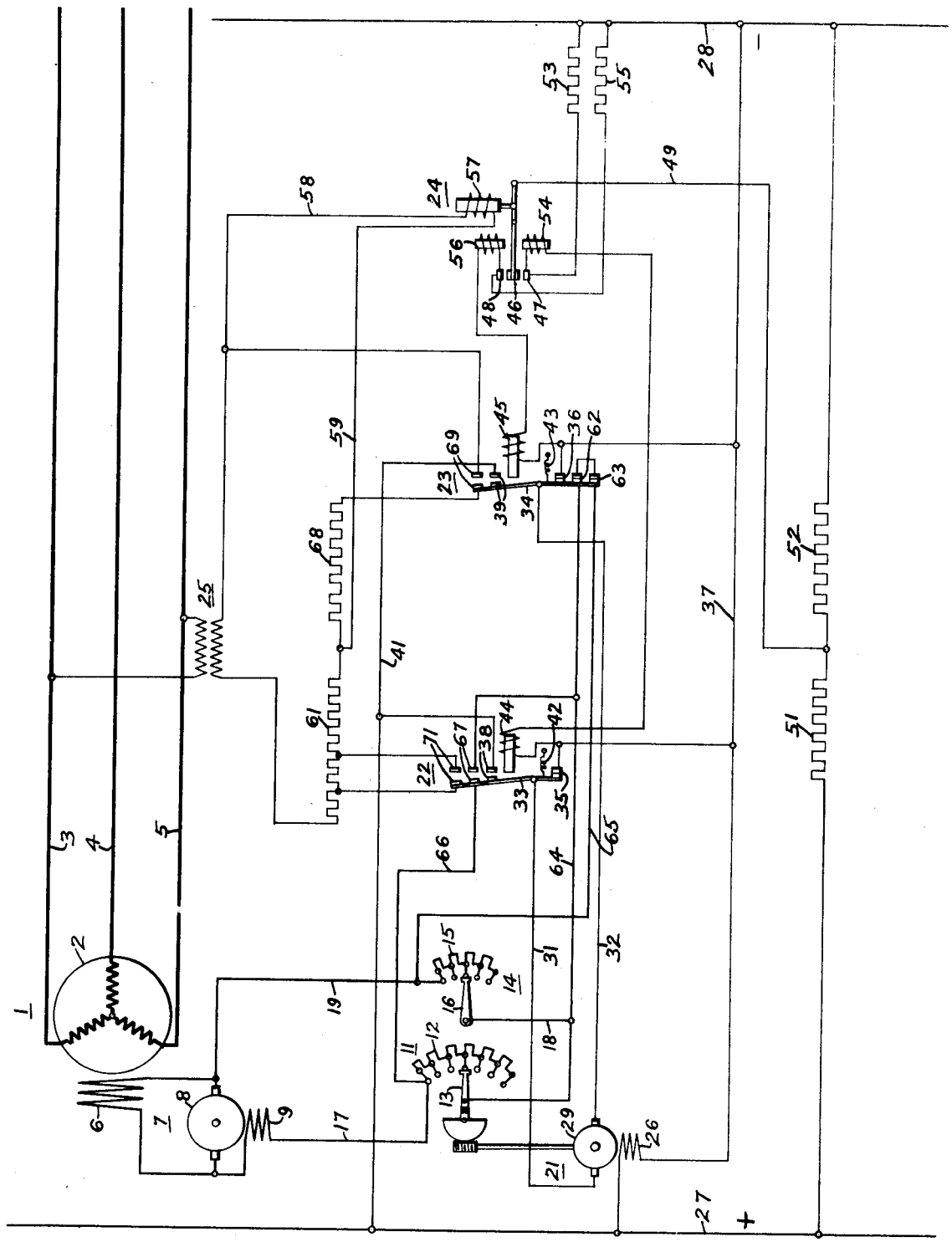
INVENTOR
John H. Ashbaugh
BY
Wesley G. Carr
ATTORNEY Patented Feb. 11, 1930

1,746,756

UNITED STATES PATENT OFFICE

JOHN H. ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed December 9, 1927. Serial No. 238,807.

My invention relates to regulator systems and more particularly to regulator systems for governing an electrical quantity of a dynamo-electric machine.

An object of my invention is to provide a regulator system that shall be quick-acting and accurate in its operation.

A further object of my invention is to provide a regulator system of the rheostatic type with means for "forcing" the field of the regulated machine during the operation of the regulator rheostat for the purpose of producing a high-speed-excitation system.

My invention contemplates the use of a motor-operated rheostat in the field circuit of a dynamo-electric machine and the provision of means for causing a rapid change in the field excitation during the corrective action of the regulator. The voltage impressed on the field winding of the machine may be abruptly varied by the operation of switch or relay contact members to shunt a resistor from, or to introduce a resistor into, the field-winding circuit of the machine during the operation of the rheostat. By this means, the change in voltage impressed upon the field winding of the machine may momentarily be several times the amount required to ultimately produce the desired correction of the machine, and, consequently, the time required for a change in the value of the field flux is considerably reduced. This arrangement, therefore, gives a high-speed-excitation system while, at the same time, retaining the desirable characteristics of the rheostatic-type regulator.

The rapid change in the field excitation of the controlled dynamo-electric machine during the operation of the regulating rheostat also provides a very effective anti-hunting means, since the normal condition of the machine is promptly restored, upon the operation of the regulator, and the contact members of the regulator become disengaged prior to an over-travel of the regulating rheostat.

In the accompanying drawing, the single figure is a diagrammatic view of apparatus and circuits comprising an embodiment of my invention.

Referring to the drawing, an electric generator 1 is provided, having an armature winding 2 that is connected to supply-circuit conductors 3, 4, 5, and a field winding 6 that is connected to be energized from an exciter generator 7. The exciter generator 7 is provided with an armature winding 8 and a field winding 9. A motor-operated rheostat 11 is provided having a resistor element 12 and a movable arm 13, and is connected, by means of conductor 17, 18, and 19, in series-circuit relation with the field winding 9 and a manually operable rheostat 14 having a resistor element 15 and a movable contact-making arm 16.

The regulating rheostat 11 is operated by a pilot motor 21 that is controlled by the reversing switches 22 and 23, in accordance with the operation of a contact-making voltmeter, or regulator 24. The regulator 24 comprises an actuating coil 57 that is operatively connected by means of a voltage transformer 25, to be energized in accordance with the voltage of the generator 1. The pilot motor 21 is provided with a field winding 26, that is connected to be energized from any suitable direct-current source, such as the supply conductors 27, 28, and with an armature winding 29, that is connected, by means of conductors 31 and 32, to movable contact arms 33 and 34 of the reversing switches 22 and 23, respectively.

When the reversing switches 22 and 23 are de-energized and stand in the positions illustrated, a circuit from the armature of the pilot motor 21 is completed through the co-operating pairs of contact members 35 and 36 of the reversing switches 22 and 23, respectively, and through conductor 37, thus forming a closed or dynamic-braking circuit for the pilot motor. The contact members 35 and 36 of the reversing switches are connected, by means of the conductor 37, to one of the direct-current supply conductors 28.

Similar pairs of contact members 38 and 39 are connected, through conductor 41, to the supply conductor 27, and are adapted to connect one side of the pilot-motor-armature winding to the supply conductor 27 upon the operation of one of the reversing switches to its second operative position.

The reversing switches 22 and 23 are provided with biasing members 42 and 43, respectively, for normally holding the switches in their illustrated or dynamic-braking positions. The reversing switches are also provided with operating electromagnets 44 and 45 that are energized in accordance with the operation of the regulator 24.

The regulator 24 comprises a movable contact member 46 that is adapted to engage one of two stationary contact members 47 and 48, and is connected, by means of the conductor 49, to a point between the resistors 51 and 52 that are connected in series-circuit relation between the supply conductors 27 and 28. Upon engagement of the contact member 46 with the contact member 47, a circuit is completed, through the resistor 53, to the direct-current supply conductor 28, and a circuit is also completed, in shunt relation to the resistor 53, through the winding of a magnet 54 of the regulator, the operating electromagnet 44 of the reversing switch 22, and conductor 37, to the supply conductor 28.

Similarly, upon engagement of the contact member 46 with the contact member 48, a circuit is completed through the resistor 55, and a second circuit is completed, in shunt relation to the resistor 55, through the winding of an electromagnet 56 of the regulator, the operating magnet 45 of the reversing switch 23, and conductor 37, to the supply conductor 28. The winding 57 of the contact-making voltmeter or regulator 24 is connected, by means of conductors 58 and 59 and a resistor 61, to the secondary winding of the voltage transformer 25, and is energized in accordance with the voltage of the generator 1.

The operation of the regulator system is as follows: If the voltage of the generator 1 falls below the desired value, the energization of the regulator winding 57 will be decreased, thus permitting the movable contact member 46 to engage the contact member 47, and establish a circuit through the winding 54 and 44 of the above traced circuit.

The magnet 54 is effective to bias the contact member 46 downwardly, thus ensuring a positive engagement of the contact members 46 and 47.

The reversing switch 22 is operated to a second operative position, separating the pair of contact members 35 and causing engagement of the cooperating pairs of contact members 38, 67 and 71. A circuit through the armature winding 29 of the pilot motor may be traced from the supply conductor 27, through conductor 41, contact members 38 of the reversing switch 22, conductor 31, armature winding 29, conductor 32, contact members 36 of the reversing switch 23, and conductor 37, to the supply conductor 28, causing the pilot motor 21 to operate the rheostat in a direction to decrease the resistance in circuit with the field winding 9 and to thus increase the excitation of the exciter generator 7 and of the generator 1.

The operation of the reversing switch 22 to its second operative position also completes a circuit in shunt relation to the rheostat 11, through conductor 66, contact members 67 of the reversing switch 22, and conductor 64, thus entirely excluding the rheostat 11 from the field circuit of the exciter generator 7 during the operation of the rheostat 11, and causing the voltage of the exciter generator to rise rapidly.

The contact members 71 of the reversing switch 22 cause a portion of the resistor 61 to be excluded from the circuit of the regulator winding 57, thus increasing the energization thereof slightly and hastening the separation of the contact members 46 and 47 to prevent the regulator from hunting.

When the voltage of the machine 1 again approaches its normal value, the contact members 46 and 47 will be disengaged, and the reversing switch 22 be biased immediately to its illustrated position, thus closing the above-traced dynamic-braking circuit through the contact members 35, causing the pilot motor 21 to stop promptly, separating the contact members 67, and interrupting the circuit in shunt relation to the rheostat 11, again introducing the rheostat into the field-winding circuit of the exciter generator. If the movement of the regulating rheostat 11 has been sufficient to correct the voltage of the generator 1 and bring it back to its normal value, the system will remain at rest until another variation in the line voltage occurs.

If the "forcing" of the field, caused by shunting the rheostat 11 from the field-winding circuit through the contact member 67, has caused the voltage of the generator to rise so rapidly that the full correction required in the setting of the rheostat 11 has not been made, the voltage of the line conductors will again drop, causing the regulator 24 to again close the circuit through the contact members 46 and 47 and continue the operation of the rheostat 11. This action will be repeated until the required correction has been made.

If the voltage of the generator 1 rises above its desired value, the winding 57 of the contact-making voltmeter or regulator 24 will be energized to cause engagement of the movable contact member 46 with the contact member 48, thus completing a circuit through the windings of the electromagnets 56 and 45 and operating the reversing switch 23 to its second operative position. The electromagnet 56 performs a function similar to that effected by the magnet 54 and causes a positive engagement between the contact members 46 and 48.

Upon operation of the reversing switch 23 to its second operative position, the pairs of cooperating contact members 36, 62 and 63 are disengaged and the pairs of contact members 39 and 69 are brought into engagement. A circuit is completed through the armature of the pilot motor 21 in the opposite direction from that completed upon the operation of the reversing switch 22 and may be traced from the direct-current supply conductor 27, through the conductor 41, contact members 39, conductor 32, armature winding 29 of the pilot motor 21, conductor 31, contact members 35 of the reversing switch 22 and conductor 37, to the direct-current supply conductor 28. The pilot motor 21 is, therefore, caused to operate the rheostat 11 in a direction to increase the resistance in the field circuit of the exciter generator to thereby decrease the voltage of the exciter generator and that of the generator 1.

The above described operation of the reversing switch 23 interrupts the circuit in shunt relation to the rheostat 14, which is normally completed through conductors 64, 65 and contact members 62 and 63, thus introducing the rheostat 14 into the field-winding circuit of the exciter generator and causing the excitation thereof to decrease rapidly during the operation of the rheostat 11. The contact members 69 complete a circuit through the resistor 68 in shunt relation to the winding 57 of the regulator, thus decreasing the excitation of the regulator winding and hastening the disengagement of the contact members 46 and 48 to prevent hunting action.

When the voltage of the generator has decreased sufficiently, the contact members 46 and 48 will be disengaged, and the reversing switch 23 will return to its illustrated position to complete the dynamic-breaking circuit for the pilot motor 21 and again shunt the rheostat 14 from the field-winding circuit of the exciter generator.

If the operation of the regulating rheostat 11 has not been sufficient to correct the excitation of the generator to maintain the desired voltage, the regulator 24 will again operate and continue the correction, as above described.

Since many modifications may be made in the apparatus and circuits described without departing from the spirit of my invention, I do not wish it to be limited otherwise than by the scope of the appended claims.

I claim as my invention:

1. In a high speed regulator system, a dynamo-electric machine comprising a field winding, means for governing the excitation of said field winding comprising a variable resistor in circuit therewith, means operable for gradually actuating said variable resistor, and means simultaneously operable for short circuiting said resistor during predetermined regulating operations.

2. In a high speed regulator system, a dynamo-electric machine comprising a field winding, a rheostat in circuit with said field winding, means actuated in accordance with an electrical quantity of said dynamo-electric machine for operating said rheostat, and means effective simultaneously with the operation of said rheostat for abruptly varying the resistance in circuit with said field winding.

3. In a high speed regulator system, a dynamo-electric machine comprising a field winding, a circuit for energizing said field winding, a rheostat in said field winding circuit, means actuated in accordance with an electrical quantity of said circuit for operating said rheostat, and means for closing a circuit in shunt relation to said rheostat during its operation in one direction.

4. In a regulator system, a dynamo-electric machine comprising a field winding, a regulator actuated in accordance with variations in the voltage of said dynamo-electric machine, means controlled by said regulator for varying the energization of said field winding, and means also controlled by said regulator effective during the operation of said last named means for forcing a sudden change in the energization of said field winding.

In testimony whereof, I have hereunto subscribed my name this 3rd day of December, 1927.

JOHN H. ASHBAUGH.